(12) United States Patent
Hu (10) Patent No.: US 8,135,832 B2
(45) Date of Patent: Mar. 13, 2012

(54) METHOD, SYSTEM AND APPARATUS FOR DETECTING MULTIPLE ACTIVE DEVICES IN STACK

(75) Inventor: Xiaolong Hu, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 309 days.

(21) Appl. No.: 12/630,034

(22) Filed: Dec. 3, 2009

(65) Prior Publication Data

US 2010/0146323 A1 Jun. 10, 2010

(30) Foreign Application Priority Data

Dec. 5, 2008 (CN) .......................... 2008 1 0182410

(51) Int. Cl.
*G06F 15/173* (2006.01)
(52) U.S. Cl. ....................................... 709/224; 709/223
(58) Field of Classification Search .................. 709/223, 709/224

See application file for complete search history.

(56) References Cited

U.S. PATENT DOCUMENTS

| | | | |
|---|---|---|---|
| 2009/0109998 A1* | 4/2009 | Vinayagam et al. | 370/465 |
| 2009/0207834 A1* | 8/2009 | Wakumoto et al. | 370/352 |
| 2009/0252170 A1* | 10/2009 | Hu | 370/395.53 |
| 2010/0115174 A1* | 5/2010 | Akyol et al. | 710/316 |

* cited by examiner

*Primary Examiner* — Firmin Backer
*Assistant Examiner* — Jonathan Bui
(74) *Attorney, Agent, or Firm* — Ladas & Parry LLP (57) ABSTRACT

Embodiments of the present invention disclose a method for detecting multiple Active devices in a stack. In the method, a new Active device generates a Link Aggregation Control Protocol (LACP) packet when a stacking link is in failure, the LACP packet contains a bridge MAC address and a member number of the new Active device; the new Active device transmits the LACP packet to a stacking member through an access switch; and the stacking member detects collision of multiple Active devices according to the MAC address and the member number and enters a Recovery state. In the present invention, by containing the bridge MAC, the Active ID and the configuration dividing identifier in the extended field of the LACP packet, the collision of multiple Active devices in a distributed stack can be detected.

14 Claims, 9 Drawing Sheets

| | Octets |
|---|---|
| Destination Address | 6 |
| Source Address | 6 |
| Length/Type | 2 |
| Subtype=LACP | 1 |
| Version Number | 1 |
| TLV_type=Actor Information | 1 |
| Actor_Information_Length=20 | 1 |
| Actor_System_Priority | 2 |
| Actor_System | 6 |
| Actor_Key | 2 |
| Actor_Port_Priority | 2 |
| Actor_Port | 2 |
| Actor_State | 1 |
| Reserved | 3 |
| TLV_type=Partner Information | 1 |
| Partner_Information_Length=20 | 1 |
| Partner_System_Priority | 2 |
| Partner_System | 6 |
| Partner_Key | 2 |
| Partner_Port_Priority | 2 |
| Partner_Port | 2 |
| Partner_State | 1 |
| Reserved | 3 |
| TLV_type=Collector Information | 1 |
| Collector_Information_Length=16 | 1 |
| CollectorMaxDelay | 2 |
| Reserved | 12 |
| TLV_type=Terminator | 1 |
| Terminator_Length=0 | 1 |
| Reserved | 50 |
| FCS | 4 |

LSB b0    b7 MSB
BITS WITHIN FRAME TRANSMITTED LEFT-TO-RIGHT →

Figure 43-7-LACPDU structure

METHOD, SYSTEM AND APPARATUS FOR DETECTING MULTIPLE ACTIVE DEVICES IN STACK

FIELD OF THE INVENTION

The present invention relates to communication technologies, and more particularly, to a method, system and apparatus for detecting multiple Active devices in a stack.

BACKGROUND OF THE INVENTION

Figure 1:
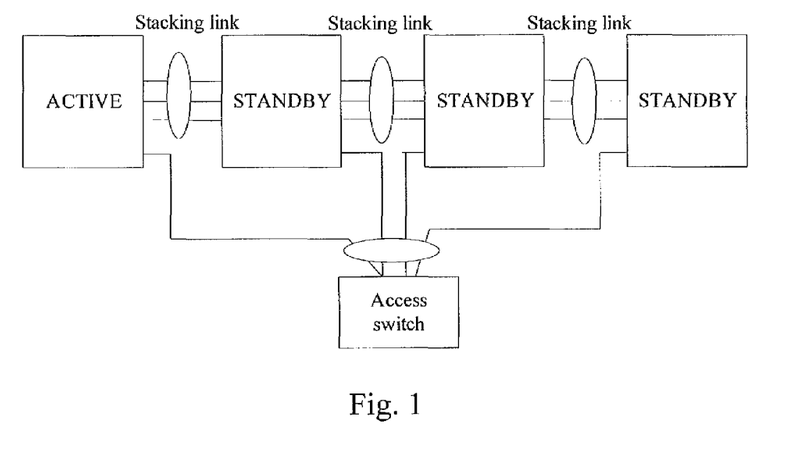
FIG. 1 is a schematic diagram illustrating a connection of a distributed stack in the prior art.

In stacking technologies, at least two distributed framed devices are connected, and one logic device, e.g. a Virtual Switching System (VSS) is formed. Devices joining in a stack are called stacking members, and the stacking members are connected with one another through a stacking link, as shown in FIG. 1. Multiple stacking members in one stack compose a virtual device with unique bridge Media Access Control (MAC), and the bridge MAC is called stacking bridge MAC. Each stacking member communicates with the external by using the unique bridge MAC. A user manages the stack just as managing a single device, so high availability, good extensibility and simple management is provided. One stack includes one Active device, and other devices in the stack are all Standby devices. The Active device is in charge of managing a stacking control plane, including executing configuration, issuing configuration etc. The Standby devices are in charge of running a data plane and performing data transmission. The data needed by the Standby devices are issued by the Active device uniformly.

The Active device and the Standby devices in the stack use the same bridge MAC and share the same configuration file. When a stacking link is in failure, the stack is split, and each stacking member runs independently, which may result in a collision of multiple Active devices. For example, all stacking members use the same bridge MAC, so a collision of the bridge MAC is caused, which results in that the Spanning Tree Protocol (STP) cannot run; for another example, all stacking members use an IP address in the same configuration file, so a collision of the IP address is caused, which results in that a three layer network cannot be used.

Figure 2:
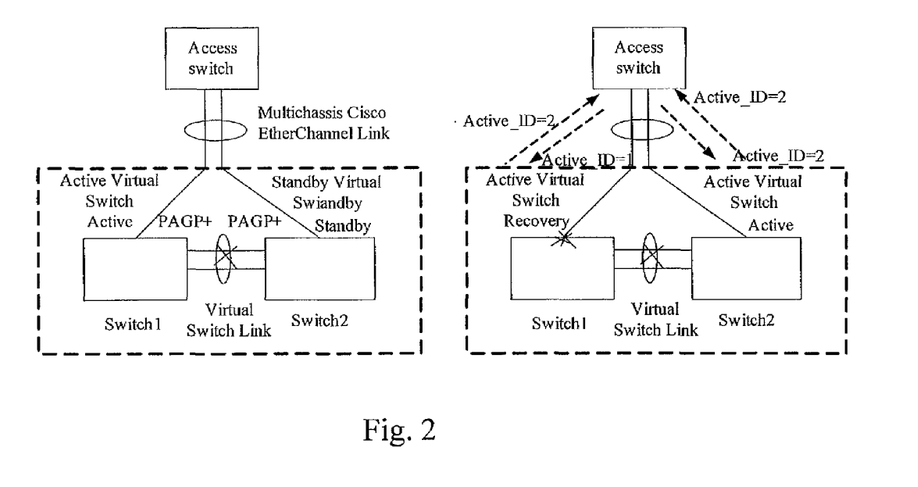
FIG. 2 is a schematic diagram illustrating a detection of multiple Active devices by using a PAgP enhanced protocol in the prior art.

Therefore, the collision of multiple Active devices in the stack needs to be detected and solved. For example, the collision of multiple Active devices may be detected by using a two-layer protocol, e.g. a Port Aggregation Protocol (PAgP) enhanced protocol. As shown in FIG. 2, at the beginning, Switch1 is an Active device and Switch2 is a Standby device; when a stacking link is in failure, Switch2 becomes an Active device, so a collision of double Active devices is caused. By extending a PAgP packet, the new Active device contains its own ACTIVE_ID in the PAgP packet and sends the PAgP packet to the original Active device through an access switch. The original Active device detects that the ACTIVE_ID in the received PAgP packet is different from a local ACTIVE_ID, and shuts down all local ports and enters a Recovery state.

Figure 3:
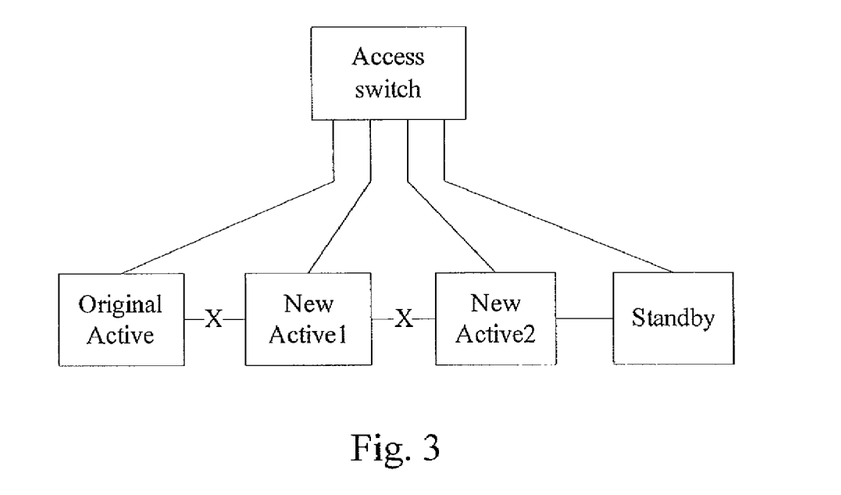
FIG. 3 is a schematic diagram illustrating a case that there are four devices in one stack and two stacking links are in failure in the prior art.

However, the PAgP enhanced protocol only supports the stack composed of two framed devices. When there are three or more devices in the stack, the detection of multiple Active devices needs to be performed, and the PAgP enhanced protocol cannot meet the requirements. As shown in FIG. 3, there are four devices in one stack, two stacking links are in failure, and two Active devices, New Active 1 and New Active 2, are generated newly. However, only the original Active device enters the Recovery state by using the PAgP enhanced protocol, and there are still two Active devices, which results in the collision of multiple Active devices.

Figure 4:
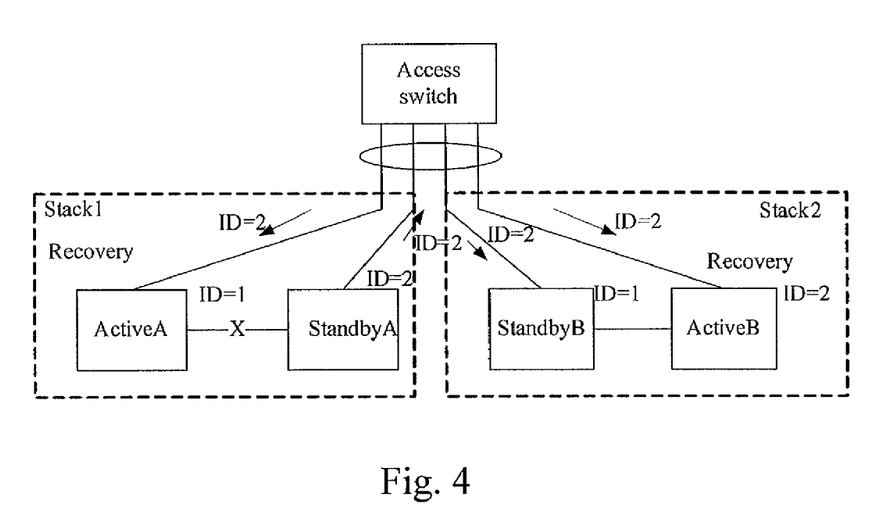
FIG. 4 is a schematic diagram illustrating a case that a PAgP enhanced protocol does not support multiple stacks in the prior art.

In addition, the PAgP enhanced protocol cannot support a case that there are multiple stacks. As shown in FIG. 4, there are two stacks, a stack1 and a stack2, and each stack is composed of two stacking members. Four interfaces of an access switch are configured as one EtherChannel Link, and the four interfaces are connected with the four stacking members respectively. When a stacking link in the stack1 is in failure, StandbyA sends a PAgP message containing ID=2 to the access switch, and the access switch transmits the PAgP message to ports of other three stacking members. After receiving the PAgP message, ActiveA enters the Recovery state. Similarly, both ActiveB and StandbyB also receive the PAgP message and enter the Recovery state. Therefore, the failure of the stacking link in the stack1 results in that the stack2 enters the Recovery state mistakenly.

In addition, not all stacking split can result in the collision of multiple Active devices. The collision of multiple Active devices mainly includes the collision of stacking bridge MAC and the collision of running configuration i.e. the configuration being used by devices. If the two collisions do not exist, even if the stack is split into multiple Active devices, the user network function cannot be affected. In the stacking technology such as an Intelligent Resilient Framework (IRF), the change of the stacking bridge MAC is allowed. For example, when an Active device leaves a stack and does not return to the stack within 6 minutes, the bridge MAC of a newly-selected Active device is used as the stacking bridge MAC, so as to avoid the collision of the bridge MAC of new and original Active devices. In a stack with good planning, a user may divide the configuration to ensure that the configuration used by one stacking member does not overlap with that used by another stacking member, so as to avoid the collision of the running configuration after the stack is split. However, the PAgP enhanced protocol only takes the change of the Active ID into account, so no matter whether the collision exists, the collision process is performed once the stack is split and there are two Active devices.

SUMMARY OF THE INVENTION

Embodiments of the present invention provide a method, system and apparatus for detecting multiple Active devices in a stack, to implement collision detection of multiple Active devices in a stack.

The embodiments of the present invention provide a method for detecting multiple Active devices in a stack, including:

generating, by a new Active device, a Link Aggregation Control Protocol (LACP) packet when a stacking link is in failure, the LACP packet containing a bridge MAC address and a member number of the new Active device;

transmitting, by the new Active device, the LACP packet to a stacking member through an access switch; and determining, by the stacking member, whether collision of multiple Active devices exists according to the bridge MAC address and the member number.

The embodiments of the present invention provide a method for detecting multiple Active devices in a stack, including:

storing, by an access switch, a list comprising a bridge MAC address and a member number of each stacking member;

receiving, by the access switch, a Link Aggregation Control Protocol (LACP) packet sent by a new Active device when a stacking link is in failure, the LACP packet containing a bridge MAC address and a member number of the new Active device;

determining, by the access switch, whether collision of multiple Active devices exists according to the bridge MAC address and the member number in the LACP packet and the bridge MAC addresses and the member numbers in the list.

The embodiments of the present invention provide an apparatus for detecting multiple Active devices in a stack, including:

a generating unit, adapted to generate a Link Aggregation Control Protocol (LACP) packet when a stacking link is in failure and the apparatus is a new Active device, the LACP packet containing a bridge MAC address and a member number of the apparatus;

a transmitting unit, adapted to transmit the LACP packet to a stacking member through an access switch;

a detecting unit, adapted to determine whether collision of multiple Active devices exists according to the bridge MAC address and the member number.

Compared with the prior art, the embodiments of the present invention at least has the following advantages.

In the embodiments of the present invention, a stacking bridge MAC address, an Active ID and a dividing identifier are contained in extended fields of a standard LACP packet, and thus the collision of multiple Active devices in a distributed stack can be detected. The present invention can detect the collision of more than two Active devices, can avoid improper collision detection when there are different stacks, and can avoid improper collision detection when there are multiple Active devices but there is no collision of running configuration.

BRIEF DESCRIPTION OF THE DRAWINGS

To describe the embodiments of the present invention or the solutions of the prior art more clearly, accompanying drawings of the embodiments of the present invention or those of the prior art will be briefly described hereinafter. Obviously, the following drawings are only some embodiments of the present invention, and those skilled in the art can obtain other drawings according to the following drawings without any inventive efforts.

DETAILED DESCRIPTION OF THE INVENTION

The embodiments of the present invention are described in detail hereinafter with reference to the accompanying drawings of the embodiments of the present invention. Obviously, the embodiments are only a part of embodiments but not all embodiments. Other embodiments made by those skilled in the art according to the embodiments of the present invention without any inventive efforts are also in the protection scope of the present invention.

In the embodiments of the present invention, detection of multiple Active devices in a distributed stack is performed by using a LACP protocol, and detection of multiple Active devices when there are multiple stacks are supported, and detection of multiple Active devices in the distributed stack may also be performed based on running configuration. Other private protocols similar to the LACP protocol may replace the LACP protocol, and data contained in the private protocol and process algorithms are the same as those in the LACP protocol.

Figure 5:
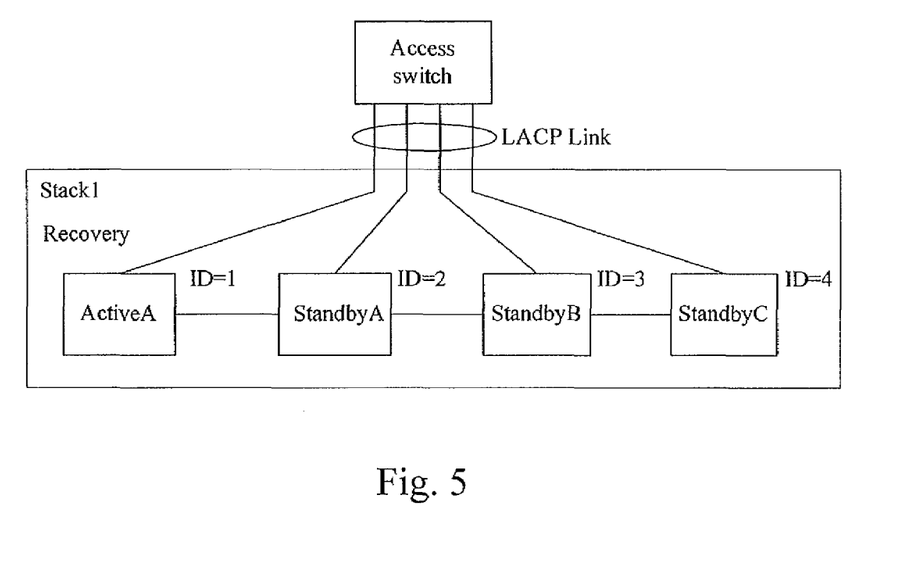
FIG. 5 is a schematic diagram illustrating a connection of stacking members and an access switch through an EtherChannel Link in accordance with an embodiment of the present invention.

In the embodiments of the present invention, each stacking member has a unique member number, and the member number of an Active device is called ActiveID. Stacking members are connected with an access switch through an EtherChannel Link. The typical networking of the stacking members and the access switch is shown in FIG. 5. Four ports of the access switch are configured as an EtherChannel Link, and each port is connected with one stacking member in stack1.

The LACP protocol is a protocol that can implement dynamic aggregation and de-aggregation of links, and can contain stacking bridge MAC and an ActiveID through extending a LACP packet. The content of the LACP packet is extended, a new Type Version Length (TVL) data field is defined in a remained field of the LACP packet, so as to exchange the ActiveID of stacking members. The format of the LACP packet is shown in FIG. 6.

Figure 6:
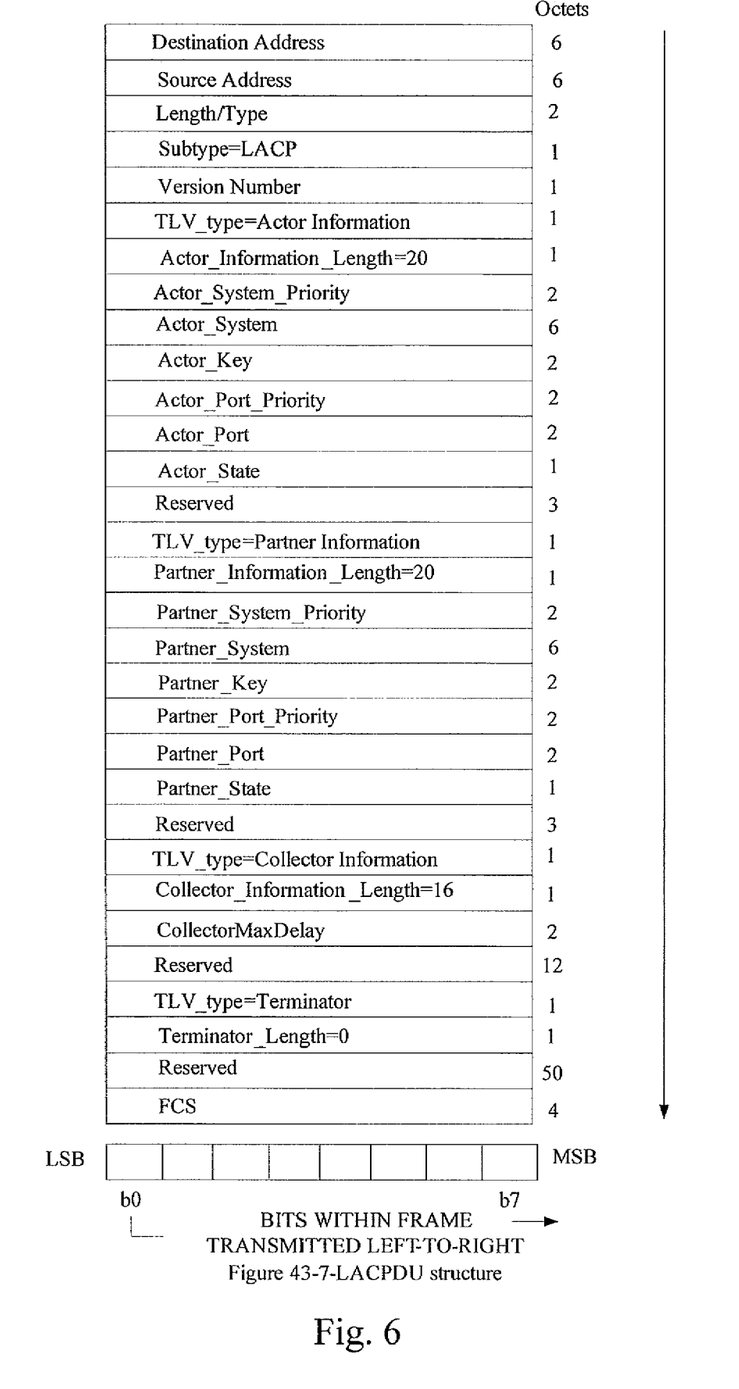
FIG. 6 is a schematic diagram illustrating format of a LACP packet in accordance with an embodiment of the present invention.
Figure 7:
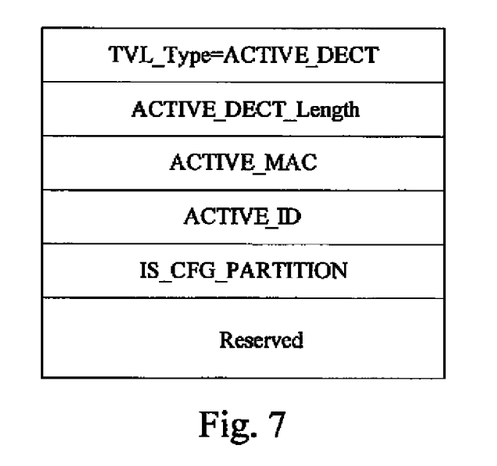
FIG. 7 is a schematic diagram illustrating format of an ACTIVE_DECT field extended by using a remained field in accordance with an embodiment of the present invention.

The format of the ACTIVE_DECT field extended by using the remained field in FIG. 6 is shown in FIG. 7. TVE_Type is ACTIVE_DECT, representing that the extended field is used for the detection of multiple Active devices in a distributed stack; ACTIVE_DECT_Length is the data length of the extended field; ACTIVE_MAC is stacking bridge MAC in the distributed stack; ACTIVE_ID is the member number of the current Active device in the distributed stack; IS_CFG_PARTITION records whether running configuration of the current stack is divided i.e. the configuration of a member device in the stack does not overlap with that of another member device in the stack; the IS_CFG_PARTITION equal to 0 represents that the running configuration of the current stack is not divided, and the IS_CFG_PARTITION equal to 1 represents that the running configuration of the current stack is divided. The Reserved field is remained, so as to be extended in the future.

The IS_CFG_PARTITION field is optional and may be contained according to requirements, and the value of the IS_CFG_PARTITION may be configured by a user. For example, in a campus network, a distributed stack is used for extending the number of access ports for dormitories, and different stacking members access networks in different floors respectively. When the configuration of the stacking members is divided well, i.e. each floor is served by a single stacking member, if a network manager hopes that each stacking member can provide an access service for each floor independently after the stack is split into multiple Active devices because of the failure of a stacking link, the network manager may configure the IS_CFG_PARTITION as 1. On the contrary, when the configuration of stacking members is not divided well, i.e. each floor is served by multiple stacking members together, if the network manager hopes that redundant Active devices are separated as soon as possible after a stacking link is in failure, the network manager may configure the IS_CFG_PARTITION as 0. In addition, the IS_CFG_PARTITION may be calculated according to the current configuration.

Figure 8:
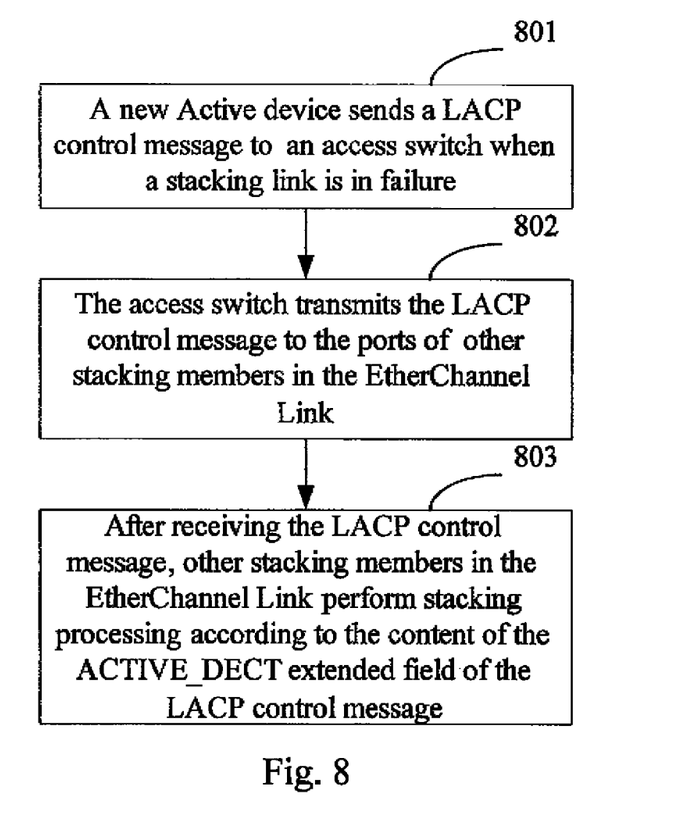
FIG. 8 is a flowchart illustrating a method for detecting multiple Active devices in a distributed stack by using a LACP protocol in accordance with an embodiment of the present invention.

In an application of the present invention for detecting multiple Active devices in a distributed stack by using the LACP protocol, such as, one stack including multiple stacking members or a combination of multiple stacks, the access switch can identify a LACP control message containing the ACTIVE_DECT type extended field, and the access switch broadcasts the LACP control message to ports of all other stacking members in the EtherChannel Link to which the access switch belongs. In addition, the stacking members have a capability of identifying and constructing the ACTIVE_DECT extended filed. As shown in FIG. 8, a specific implementation includes the following processes.

Block 801, when a stacking link is in failure, a new Active device sends a LACP control message to an access switch. Specifically, when the stacking link is in failure, the distributed stack detects the failure rapidly and selects the new Active device immediately; the new Active device constructs the LACP control message, information, such as stacking bridge MAC of the new Active device, Active ID and the information on whether the running configuration is divided is contained in the ACTIVE_DECT extended filed, and the new Active device sends the LACP control message to the access switch through the port of stacking member in the EtherChannel Link.

Block 802, the access switch transmits the LACP control message to the ports of the stacking members in the EtherChannel Link. Specifically, after receiving the LACP control message, the access switch checks extended fields; when finding the ACTIVE_DECT extended field, the access switch transmits the LACP control message to the ports of other stacking members in the EtherChannel Link.

Block 803, after receiving the LACP control message, other stacking members in the EtherChannel Link perform processing according to the content of the ACTIVE_DECT extended field in the LACP control message. At this block, the Active devices perform the processing, while the Standby devices just receive the LACP control message and do not perform any processing.

Figure 9:
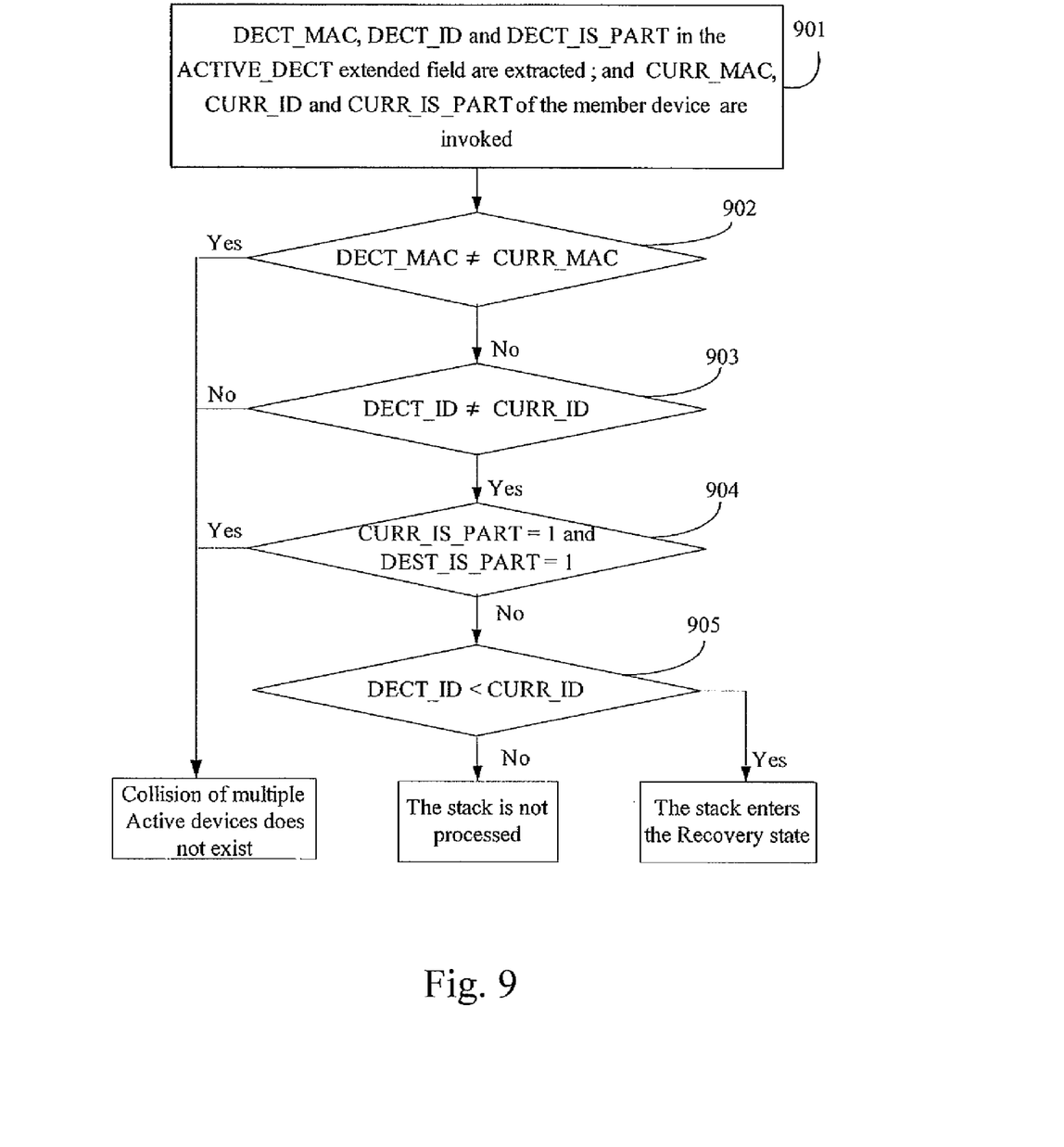
FIG. 9 is a flowchart illustrating processing according to the content of an extended field of a LACP control message in accordance with an embodiment of the present invention.

As shown in FIG. 9, the specific implementation of Block 803 includes the following processes.

Block 901, the stacking bridge MAC recorded as DECT_MAC, the Active ID recorded as DECT_ID and a dividing identifier DECT_IS_PART in the ACTIVE_DECT extended field of the LACP control message are extracted; and local stacking bridge MAC recorded as CURR_MAC, local Active ID recorded as CURR_ID and a local dividing identifier CURR_IS_PART are invoked.

Block 902, it is determined whether the DECT_MAC is equal to the CURR_MAC; if the DECT_MAC is not equal to the CURR_MAC, the stacking member and the new Active device are not in the same stack, the collision of multiple Active devices does not exist, and the stacking member does not need to enter the Recovery state, so as to avoid the problem in the prior art as shown in FIG. 4. If the DECT_MAC is equal to the CURR_MAC, the stacking member and the new Active device are in the same stack, the collision of multiple Active devices may exist, and Block 903 is performed.

Block 903, it is determined whether the DECT_ID is equal to the CURR_ID; if the DECT_ID is equal to the CURR_ID, the packet is a loop packet of the current device, the collision of multiple Active devices does not exist, and the packet is discarded; if the DECT_ID is not equal to the CURR_ID, the collision of multiple Active devices may exist, and Block 904 is performed.

Block 904, it is determined whether the configuration of one stacking member overlaps with that of another stacking member according to the DECT_IS_PART and the CURR_IS_PART; if the CURR_IS_PART is not equal to 1, or the DECT_IS_PART is not equal to 1, the running configuration of the stack is divided, and the configuration of one stacking member does not overlap with that of another stacking member, so the collision of multiple Active devices does not exist; otherwise, the collision of multiple Active devices may exist, and Block 905 is performed.

Block 905, it is determined whether the DECT_ID is smaller than the CURR_ID; if the DECT_ID is smaller than the CURR_ID, the stack including the Active device and the Standby devices enters the Recovery state; otherwise, no processing is performed. Therefore, when the collision is detected, an Active device with the larger Active ID enters the Recovery state and shuts down all network interfaces, so as to ensure that an Active device with the smallest member number keeps the network function available when there are multiple Active devices. Other manners can be used to ensure that only one Active device is remained and other Active devices enter the Recovery state when there are multiple Active devices. For example, an Active device with the smaller Active ID enters the Recovery state.

Figure 10:
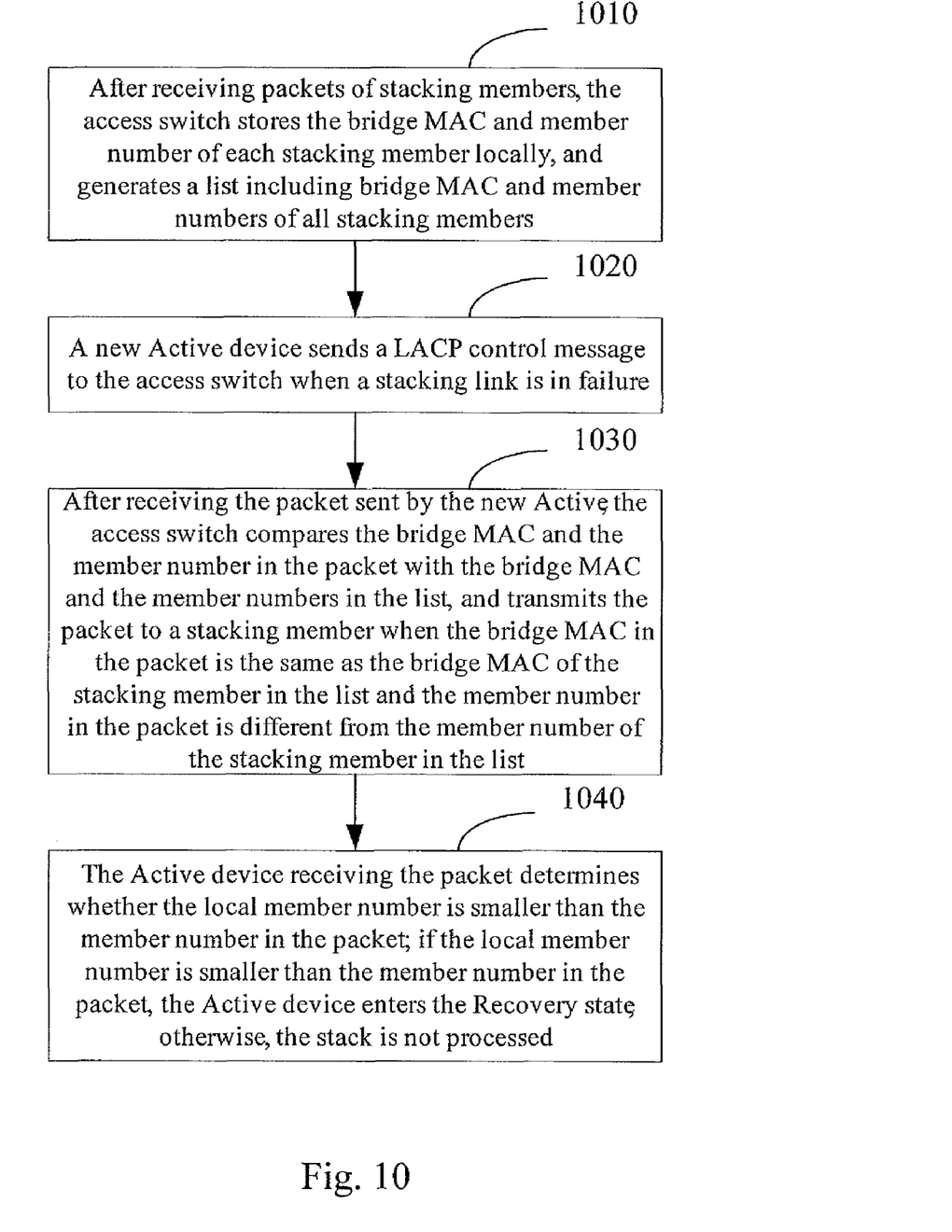
FIG. 10 is flowchart illustrating a detection of stacking members performed in an access switch in accordance with an embodiment of the present invention.

In the embodiments of the present invention, the detection of the stacking members may be performed in the access switch. As shown in FIG. 10, the detection includes the following processes.

Block 1010, after receiving packets of stacking members, the access switch stores the bridge MAC and member number of each stacking member locally, and generates a list including bridge MAC and member numbers of all stacking members.

Block 1020, when a stacking link is in failure, a new Active device sends a LACP control message to the access switch. Specifically, the new Active device constructs the LACP control message, information, such as the stacking bridge MAC of the new Active device, Active ID, and the information on whether the running configuration is divided is contained in the ACTIVE_DECT extended field, and the new Active device sends the LACP control message to the access switch through the port of stacking member in the EtherChannel Link.

Block 1030, after receiving the packet sent by the new Active device, the access switch compares the bridge MAC and the member number in the packet with the bridge MAC and the member numbers in the list, and transmits the packet to a stacking member when the bridge MAC in the packet is the same as the bridge MAC of the stacking member in the list and the member number in the packet is different from the member number of the stacking member in the list.

Block 1040, the Active device receiving the packet determines whether the local member number is smaller than the member number in the packet; if the local member number is smaller than the member number in the packet, the Active device enters the Recovery state; otherwise, no processing is performed, to ensure an Active device with the larger Active ID enters the Recovery states and shuts down all network interfaces, and only the Active device with the smallest member number keeps the network function available when there are multiple Active devices. When receiving the packet, the Standby device does not perform processing. Other manners can be used to ensure that only one Active device is remained and other Active devices enter the Recovery state when there are multiple Active devices. For example, an Active device with the smaller Active ID enters the Recovery state.

The process of comparing the member numbers in Block 1040 may be implemented in the access switch.

Figure 11:
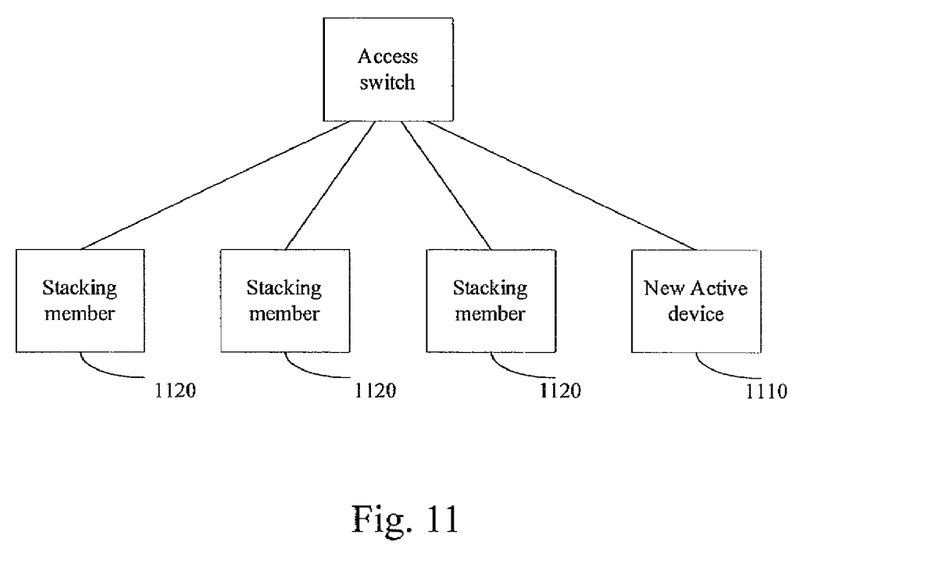
FIG. 11 is a schematic diagram illustrating a structure of a system for detecting multiple Active devices in a stack in accordance with an embodiment of the present invention.

The embodiments of the present invention provide a system for detecting multiple Active devices in a stack. As shown in FIG. 11, the system includes: a new Active device 1110 and stacking members 1120. The new Active device is adapted to generate a LACP packet, and the LACP packet contains a bridge MAC address and a member number of the new Active device. The new Active device is also adapted to transmit the LACP packet to stacking members 1120 through an access switch; the stacking member 1120 is adapted to detect collision of multiple Active devices according to the MAC address and the member number, and enter a Recovery state.

The new Active device includes a generating unit and a transmitting unit.

The generating unit is adapted to generate the LACP packet, and the LACP packet contains the bridge MAC address and the member number of the new Active device.

The transmitting unit is adapted to transmit the LACP packet to the stacking members 1120 through the access switch.

Each stacking member 1120 includes a detecting unit and a state controlling unit.

The detecting unit is adapted to determine that the collision of multiple Active devices does not exist when detecting that a bridge MAC address recorded locally is different from the bridge MAC address contained in the LACP packet. The detecting unit is also adapted to determine that the collision of multiple Active devices exists when detecting that the bridge MAC address recorded locally is the same as the bridge MAC address contained in the LACP packet and a local member number is different from the member number contained in the LACP packet.

The state controlling unit is adapted to determine whether the stacking member needs to enter the Recovery state according to the member number of the stacking member.

The embodiments of the present invention provide a stacking apparatus.

Figure 12:
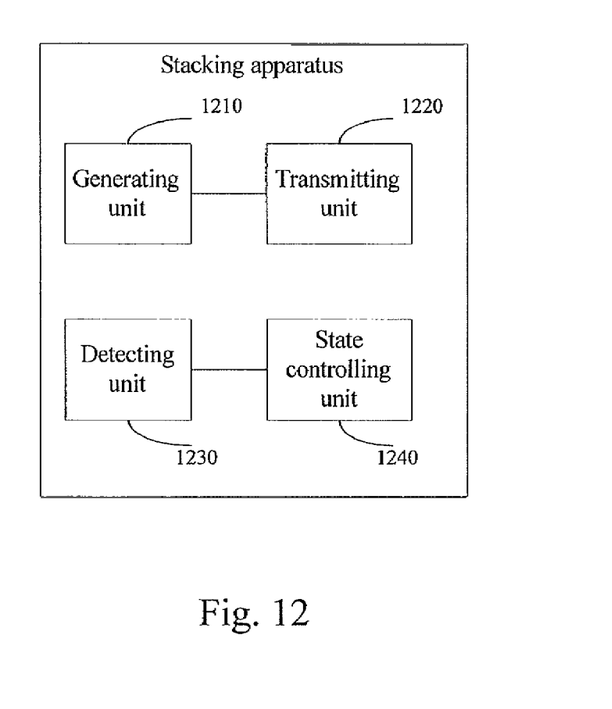
FIG. 12 is a schematic diagram illustrating a structure of an apparatus for detecting multiple Active devices in a stack in accordance with an embodiment of the present invention.

As shown in FIG. 12, the stacking apparatus includes a generating unit 1210, a sending unit 1220, a detecting unit 1230 and a state controlling unit 1240, and the stacking apparatus is a new Active device after a stacking link is in failure.

The generating unit 1210 is adapted to generate a LACP packet, and the LACP packet contains a bridge MAC address and a member number of the stacking apparatus.

The sending unit 1220 is adapted to transmit the LACP packet to a stacking member through an access switch.

The detecting unit 1230 is adapted to determine that collision of multiple Active devices does not exist when detecting that a bridge MAC address recorded locally is different from the bridge MAC address contained in the LACP packet, and the detecting unit 1230 is further adapted to determine that the collision of multiple Active devices exists when detecting that the bridge MAC address recorded locally is the same as the bridge MAC address contained in the LACP packet and a local member number is different from the member number contained in the LACP packet.

The state controlling unit 1240 is adapted to determine whether the stacking device needs to enter a Recovery state according to the member number of the stacking apparatus.

Figure 13:
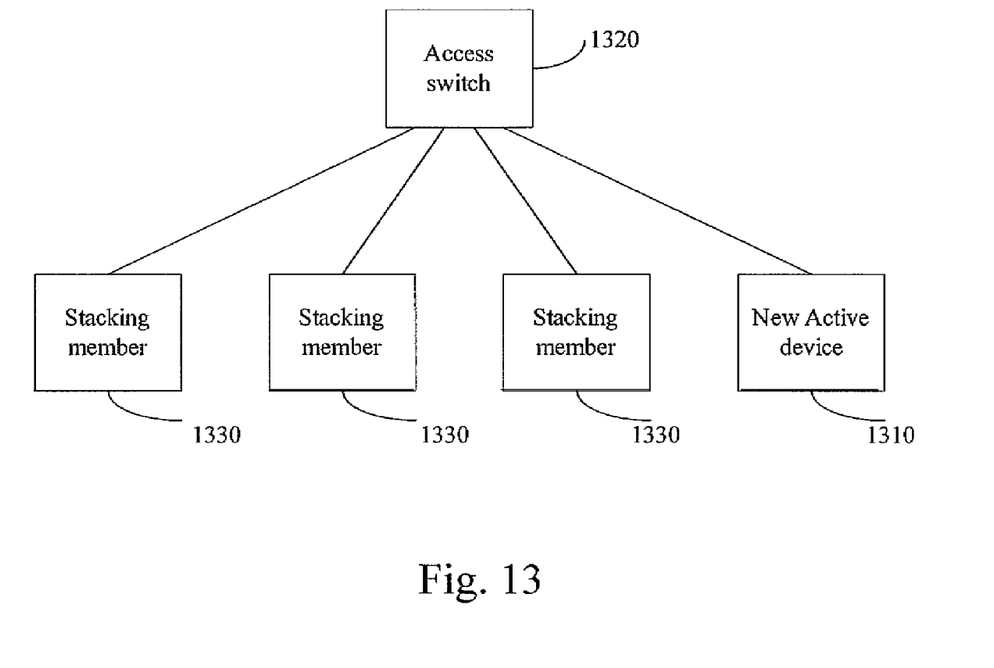
FIG. 13 is a schematic diagram illustrating a structure of a system for detecting multiple Active devices in a stack in accordance with an embodiment of the present invention.

The embodiments of the present invention provide a system for detecting multiple Active devices in a stack. As shown in FIG. 13, the system includes a new Active device 1310, an access switch 1320, and a stacking member 1330.

The new Active device is adapted to generate a LACP packet, the LACP packet contains a bridge MAC address and a member number of the new Active device, and the new Active device is also adapted to transmit the LACP packet to the stacking member 1320 through the access switch.

The access switch 1320 is adapted to generate a list comprising bridge MAC addresses and member numbers of all stacking members, compare the bridge MAC address and the member number in the LACP packet with the bridge MAC addresses and the member numbers in the list respectively, and transmit the LACP packet to a stacking member when the bridge MAC address in the LACP packet is the same as a bridge MAC address of the stacking member in the list and the member number in the LACP packet is different from the member number of the stacking member in the list.

The stacking member 1330 is adapted to determine whether the stacking member needs to enter a Recovery state according to the member number of the stacking member.

The new Active includes a generating unit and a transmitting unit. The generating unit is adapted to generate the LACP packet, and the LACP packet contains the bridge MAC address and the member number of the new Active device. The transmitting unit is adapted to transmit the LACP packet to the stacking member through the access switch.

The access switch includes a list generating unit and a comparing unit. The list generating unit is adapted to generate the list comprising the bridge MAC addresses and the member numbers of all stacking members. The comparing unit is adapted to compare the bridge MAC address and the member number in the LACP packet with the bridge MAC addresses and the member numbers in the list respectively, and transmit the LACP packet to the stacking member when the bridge MAC address in the LACP packet is the same as the bridge MAC address of the stacking member in the list and the member number in the LACP packet is different form the member number of the stacking member in the list.

The stacking member includes a receiving unit and a controlling unit. The receiving unit is adapted to receive the LACP packet from the access switch. The controlling unit is adapted to determine whether the stacking member needs to enter the Recovery state according to the member number of the stacking member.

Figure 14:
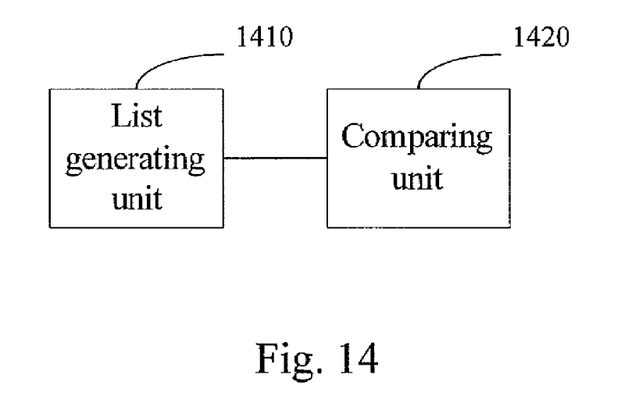
FIG. 14 is a schematic diagram illustrating a structure of an access switch in accordance with an embodiment of the present invention.

The embodiments of the present invention provide an access switch, as shown in FIG. 14. The access switch includes a list generating unit 1410 and a comparing unit

1420. The list generating unit 1410 is adapted to generate a list comprising bridge MAC addresses and member numbers of all stacking members. The comparing unit 1420 is adapted to compare a bridge MAC address and a member number in a Link Aggregation Control Protocol (LACP) packet with the bridge MAC addresses and the member numbers in the list respectively, and transmit the LACP packet to a stacking member when the bridge MAC address in the LACP packet is the same as a bridge MAC address of the stacking member in the list and the member number in the LACP packet is different form a member number of the stacking member in the list.

The foregoing description is only the embodiments of the present invention. It should be noted that, all the modifications, equivalent replacements or improvements made by the skilled person in the art according to the principle of the present invention should be included in the protection scope of the present invention.

What is claimed is:

1. A method for detecting multiple Active devices in a stack, comprising:
    generating, by a new Active device, a Link Aggregation Control Protocol (LACP) packet when a stacking link is in failure, the LACP packet containing a bridge MAC address and a member number of the new Active device;
    transmitting, by the new Active device, the LACP packet to a stacking member through an access switch; and
    determining, by the stacking member, whether collision of multiple Active devices exists according to the bridge MAC address and the member number,
    wherein determining, by the stacking member, whether the collision of multiple Active devices exists according to the bridge MAC address and the member number comprises:
        determining the collision of multiple Active devices does not exist when a bridge MAC address of the stacking member is different from the bridge MAC address contained in the LACP packet; and
        determining the collision of multiple Active devices exists when the bridge MAC address of the stacking member is the same as the bridge MAC address contained in the LACP packet and a member number of the stacking member is different from the member number contained in the LACP packet.

2. The method of claim 1, wherein the LACP packet further contains a dividing identifier, and the method further comprises:
    determining, by the stacking member, whether the collision of multiple Active devices exists according to the dividing identifier.

3. The method of claim 1, further comprising:
    maintaining one Active device in the stacking member and the new Active device according to the member numbers of the stacking member and the new Active device;
    keeping a network function of the one Active device available; and
    entering, by the other Active devices, a Recovery state.

4. The method of claim 3, wherein maintaining one Active device in the stacking member and the new Active device according to the member numbers of the stacking member and the new Active device comprises:
    maintaining an Active device with the smallest member number in the stacking member and the new Active device; or
    maintaining an Active device with the largest member number in the stacking member and the new Active device.

5. A method for detecting multiple Active devices in a stack, comprising:
    storing, by an access switch, a list comprising a bridge MAC address and a member number of each stacking member;
    receiving, by the access switch, a Link Aggregation Control Protocol (LACP) packet sent by a new Active device when a stacking link is in failure, the LACP packet containing a bridge MAC address and a member number of the new Active device;
    determining, by the access switch, whether collision of multiple Active devices exists according to the bridge MAC address and the member number in the LACP packet and the bridge MAC addresses and the member numbers in the list,
    wherein determining, by the access switch, whether collision of multiple Active devices exists according to the bridge MAC address and the member number in the LACP packet and the bridge MAC addresses and the member numbers in the list comprises:
        determining the collision of multiple Active devices does not exist when each of the bridge MAC addresses in the list is different from the bridge MAC address contained in the LACP packet; and
        determining the collision of multiple Active devices exists when the bridge MAC address in the list is the same as the bridge MAC address contained in the LACP packet and the member number of the stacking member in the list is different from the member number contained in the LACP packet.

6. The method of claim 5, further comprising:
    transmitting, by the access switch, the LACP packet to the stacking member when the collision of multiple Active devices exists.

7. The method of claim 6, further comprising:
    remaining one Active device in the Active device receiving the LACP packet and the new Active device according to member numbers of the Active device receiving the LACP packet and the new Active device;
    keeping a network function of the one Active device available; and
    entering, by the other Active devices, a Recovery state.

8. The method of claim 6, wherein remaining one Active device in the Active device receiving the LACP packet and the new Active device according to the member numbers of the Active device receiving the LACP packet and the new Active device comprises:
    remaining an Active device with the smallest member number in the Active device receiving the LACP packet and the new Active device; or
    remaining an Active device with the largest member number in the Active device receiving the LACP packet and the new Active device.

9. The method of claim 5, further comprising:
    determining, by the access switch, one Active device with available network function according to the member numbers in the list and the member number in the LACP packet when the collision of multiple Active devices exists;
    notifying, by the access switch, the other Active devices to enter a Recovery state.

10. The method of claim 8, wherein determining, by the access switch, one Active device with available network function according to the member numbers in the list and the member number in the LACP packet comprises:

determining the Active device with the smallest member number as the one Active device with available network function; or determining the Active device with the largest member number as the one Active device with available network function.

11. An apparatus for detecting multiple active devices in a stack, comprising:

a generating unit, adapted to generate a Link Aggregation Control Protocol (LACP) packet when a stacking link is in failure and the apparatus is a new Active device, the LACP packet containing a bridge MAC address and a member number of the apparatus;

a transmitting unit, adapted to transmit the LACP packet to a stacking member through an access switch;

a detecting unit, adapted to determine whether collision of multiple Active devices exists according to the bridge MAC address and the member number, wherein the detecting unit is adapted to:

determine that collision of the multiple Active devices does not exist when a bridge MAC address of the apparatus is different from the bridge MAC address contained in the LACP packet; and determine that the collision of multiple Active devices exists when the bridge MAC address of the apparatus is the same as the bridge MAC address from the member number contained in the LACP packet.

12. The apparatus of claim 11, wherein the detecting unit is adapted to determine whether the collision of multiple Active devices exists according to a dividing identifier.

13. The apparatus of claim 11, further comprising:

a state controlling unit, adapted to determine whether the apparatus needs to enter a Recovery state according to a member number of the apparatus when the detecting unit determines that the collision of the multiple Active devices exists.

14. The apparatus of claim 13, wherein the state controlling unit is adapted to determine the apparatus needs to enter the Recovery state when the member number of the apparatus is the smallest or the largest.

* * * * *